United States Patent [19]

Stoll et al.

[11] Patent Number: 5,069,317

[45] Date of Patent: Dec. 3, 1991

[54] PNEUMATIC SHOCK ABSORBER

[76] Inventors: Kurt Stoll, Lenzhalde 72,, 7300 Esslingen; Herbert Halama, Hildegardstrass 16, 7314 Wernau, both of Fed. Rep. of Germany

[21] Appl. No.: 277,707

[22] Filed: Nov. 30, 1988

[30] Foreign Application Priority Data

Dec. 1, 1987 [DE] Fed. Rep. of Germany ....... 3740669

[51] Int. Cl.$^5$ ............................................. F16F 9/50
[52] U.S. Cl. ................................. 188/286; 188/299; 267/64.16
[58] Field of Search ............................. 180/707, 714; 267/64.16, 64.17; 188/280, 284, 285, 286, 299, 315

[56] References Cited

U.S. PATENT DOCUMENTS

| 1,036,340 | 8/1912 | Rockwell et al. | 188/301 |
| 1,486,911 | 3/1924 | Messier | 267/64.16 |
| 2,767,601 | 10/1956 | Reed | 188/286 X |
| 3,913,460 | 10/1975 | Wright . | |
| 3,960,251 | 6/1976 | Gorissen | 188/286 |
| 4,506,751 | 3/1985 | Stephens | 188/285 X |
| 4,585,205 | 4/1986 | Coppola et al. . | |
| 4,700,611 | 10/1987 | Kaneko | 188/28 X |
| 4,730,816 | 3/1988 | Eckert | 280/707 X |

FOREIGN PATENT DOCUMENTS

| 97275 | 6/1983 | European Pat. Off. . |
| 1214998 | 6/1961 | Fed. Rep. of Germany . |
| 2547916 | 10/1975 | Fed. Rep. of Germany . |
| 2550244 | 11/1975 | Fed. Rep. of Germany . |
| 2609434 | 3/1976 | Fed. Rep. of Germany . |
| 119292 | 12/1976 | Fed. Rep. of Germany . |
| 2730860 | 7/1977 | Fed. Rep. of Germany . |
| 3150081 | 12/1981 | Fed. Rep. of Germany . |
| 3434033 | 9/1984 | Fed. Rep. of Germany . |
| 3506180 | 2/1985 | Fed. Rep. of Germany . |
| 1016986 | 6/1963 | United Kingdom . |

Primary Examiner—Duane A. Reger
Attorney, Agent, or Firm—McGlew and Tuttle

[57] ABSTRACT

A pneumatic shock absorber has a piston rod extending out of its cylinder whose pressure space adjacent to the piston is connected via an inlet check valve. An outlet valve to let off compressed air during damping motion of the piston has a valve piston running in a valve chamber which it divides into two chamber parts. The first chamber part connects a duct leading to the pressure space with an outlet valve. This connection may be interrupted by the end face of the valve piston acted on at least in part by the pressure in the pressure space of the absorber and cooperating with a valve seat. The second chamber part is connected with the pressure space or with the pressure source. There is a spring urging the valve piston towards the valve seat. As a result there are not losses in pressure in the two abutment positions and the damping effect is very even and continuous.

24 Claims, 4 Drawing Sheets

PNEUMATIC SHOCK ABSORBER

BACKGROUND OF THE INVENTION

The invention relates to a pneumatic shock absorber comprising a cylinder, a piston mounted in the cylinder and arranged so that its piston rod extends out of the cylinder, a check valve forming an inlet port via which a pressure space delimited by the piston may be connected with an external source of fluid under pressure and an outlet valve to let off air compressed during damping motion of the pneumatic shock absorber.

An increase in the productivity of a machine is often something taking place in step with an increase in the speed of the drives used therein. Even pneumatic drives presently reach speeds as high as 3 m/s and more. In order to keep violent impacts, noise or vibration within reasonable limits, long familiar methods of energy conversion have been used in order to convert energy in the terminal drive positions by terminal damping or by hydraulic shock absorbers and in addition pneumatic shock absorbers have been employed, more especially in those cases in which for reasons of system geometry a pneumatic damping means is not able to be integrated in the pneumatic linear actuator. The advantages of a pneumatic shock absorber are to be seen more especially in a low weight, in the possibility of use at high stroke frequencies and the insensitivity to an increase in the operating temperature. Furthermore it is possible to achieve a gentler start of the damping effect. Unlike a hydraulic shock absorber it may also be used without any disadvantages in the foodstuffs industry and in medical appliances, since such a pneumatic shock absorber does not cause contamination. The rate of energy conversion is substantially higher than in the case of a hydraulic shock absorber.

A pneumatic shock absorber described in the German unexamined specification 2,730,860 of the initially mentioned type has an inlet check valve and an adjustable outlet excess pressure valve. This is partly necessary in order to let off compressed air when there is a pressure surge in the pressure space with the intention of preventing recoil from the terminal abutment and furthermore such an excess pressure valve precludes loss of the compressed air flowing in via the check valve in the unloaded condition. In order to adapt to different impact energies or masses to be retarded the initial pressure in the pressure space may be adjusted. Since the outlet valve always opens at a certain set pressure value such opening takes place at a higher pressure substantially earlier than is the case with a lower initial pressure. Thus the damping characteristic depends in an undesired manner to a great extent on the initial pressure which has been set. It is naturally possible to use the set screw in the piston rod to adjust the opening pressure value of the outlet valve. However, if the initial pressure is to be frequently changed this becomes a very inconvenient task and takes up much time. A further disadvantage is to be seen in the fact that the outlet valve requires a very stiff valve spring, more especially when the initial pressure is very high or the masses to be damped are very large. The result of this is that a very high residual pressure still acts on the piston in the retracted position, such pressure remaining after the outlet valve has closed again.

SHORT SUMMARY OF THE INVENTION

Accordingly one object of the invention is to provide a pneumatic shock absorber of the initially specified type which has substantially constant damping properties so that the time of opening of the outlet valve is substantially independent from the set initial pressure.

In order to achieve these or other objects appearing from the present specification and claims, the outlet valve has a valve piston sliding in a sealing manner in the valve chamber and dividing same into two chamber parts, the first chamber part is connected by means of a duct leading to the pressure space with an outlet duct, the connection being able to be interrupted by a valve seat able to be closed by the end face, at least partly acted upon by the pressure of the pressure space, of the valve piston, the second chamber part is connected with the pressure space or with the pressure source and there is a spring urging the valve piston against the valve seat. The advantages of such a pneumatic shock absorber are to be seen more especially in the fact that in the outlet valve there is pressure compensation at least by a value equal to the level of the initial pressure, such compensation excluding premature opening of the outlet valve at an increased initial pressure. It is in this manner that the time of opening or the piston setting, at which the outlet valve opens is made independent of the initial pressure setting so that it is possible to ensure a more even damping characteristic at a different initial pressure value. By varying the acting pressure faces on opposite sides of the valve piston it is possible to provide a further way of altering the damping characteristic, that is to say in this manner it is possible to ensure that the outlet valve only opens fully towards the end of the damping stroke or right at the beginning of the damping stroke, the damping characteristic then being set by the outlet duct or a choke arranged therein. In either case there is a very even and continuous damping effect along practically the full damping stroke.

The claims define further developments of the invention.

In accordance with one advantageous feature of the invention the ducts leading to the outlet valve and the check valve run from the end surface, delimited by the pressure space, of the cylinder or are arranged in or on same. This ensures that the entire valve control system is compactly arranged at one end of the cylinder.

A forced opening of the outlet valve at a given setting of the damping piston may be achieved in a manner independent of the set or existing pressure conditions in a simple manner if the valve piston has a plunger which when the valve seat is closed extends into the pressure space axially and if the acting pressure face on the valve piston in the second chamber part is at least equal in size to the face shutting the valve seat. It is particularly convenient in this design if the second chamber part is connected with the pressure space. During the entire damping stroke there are thus equal pressures on the two sides of the valve piston so the latter requires only a small spring force to keep it on the valve seat. It is only when the damping piston strikes the plunger shortly before reaching the end position that the outlet valve is thus opened. If the acting pressure surface area on the valve piston in the second chamber part is larger than the surface closing the valve seat, the retaining force of the valve piston on the valve seat will be increased so that even delayed pressure events caused by the flow characteristics do not cause a premature opening of the outlet valve.

As an alternative to this it is possible for the second chamber also to be connected with the source of pressure and for the surface on which the pressure acts on the valve pistons in the second chamber part to be substantially equal to the surface area closing the valve seat. In this case only the initial pressure acting on the valve piston is compensated, that is to say the pressure on the outlet valve, so that the latter is not able to have any effect on the valve behavior. Dependent on the force of the spring the outlet valve may open very quickly during a damping operation, the damping characteristic then being determined as a consequence of the resistance to flow in the outlet duct or of a choke arranged therein. This choke may be made so that it is replaceable or adjustable to adapt to different desired damping properties. The valve spring may naturally also be so designed that the outlet valve opens very late. In this case the above described arrangement of a plunger on this valve piston may prove to be suitable for forcing the latter to open shortly prior to reaching the terminal position.

The end surface of the cylinder having the duct ports of the cylinder or the piston surface turned towards this end surface is preferably provided with a seal at least shutting off the ducts in the abutting position, such seal more especially being in the form of a sheet-like sealing covering. This leads in any case to a sealing of the duct, leading to the pressure source, from the outlet duct, something that is more especially important if the valve piston has a spring holding it open in the abutting position.

In the case of a design with such a plunger the valve spring also preferably serves to snap the damping piston out of its abutting position if no further force is exerted on it by the mass to be damped.

The initial pressure setting in the pressure space as established by the external source of pressure is controlling as regards the damping properties. The external pressure source may for instance have an adjustable pressure controlling valve, via which the initial pressure in the pressure space may be so set that the piston is just caused to reach the second abutment setting by the impact of the mass to be damped. If the impact energy of the mass to be damped changes, it is then appropriate to reset the initial pressure, this also being basically required in order to adapt to different locations. In a given case, as for instance when continual changes in the impact energy take place, such resetting may prove to be very inconvenient.

The manual setting of the initial pressure for optimizing the damping properties may advantageously be made superfluous if the external pressure source is connected with the pressure space via a pressure controller and if a sensor responsive to the motion and/or the setting of the piston at least where the pressure space is at a minimum is provided and if an automatic control circuit is provided responsive to the signal from the sensor. In this manner it is possible to automatically check during each shock absorbing operation if the initial pressure is excessively high or low so that when required a suitable correction is made by an automatic pressure control circuit. Both an initial manual setting and also subsequent adjustment required due to changing conditions may thus be made unnecessary. The damping behavior is always set or reset to an optimum value so that the invention is more especially suitable for applications with changing impact energies. The advantages of such an automatic pressure regulation make themselves felt not only in connection with a pneumatic shock absorber of the type claimed herein, but also in connection with other shock absorbers in which the pressure space is subject to an initial pressure for setting the damping properties.

Further advantageous features of the invention are described in the claims.

The automatic pressure control circuit preferably has an electronic automatic controller by which the pressure as preset by the pressure controller and occurring on impact of the piston is increased by the second impact abutment setting occurring at minimum pressure space volume and is decreased if this second abutment setting is not reached.

An even finer adjustment of the optimum damping properties may be achieved if the sensor connected with the automatic controller for detecting when the second abutment position has been reached and if neither of these positions is reached a larger reduction in pressure may be caused and if only the second abutment positions a smaller reduction in pressure is able to be brought about. A further improvement is made possible if in the event of there being a speed of approach under an adjustable limit towards the second abutment position, the pressure of the automatic pressure controller is reduced. It is especially a combination of these features which leads to the desired further improvement inasmuch as if the two positions are only reached once and if the adjustable limit is gone below a small decrease in pressure is able to be caused.

Furthermore the resetting at an excessively low pressure may be improved if on going below a given number of sensor signals indicating that the second abutment position has been reached it is possible for an increase in pressure to be caused and/or if the second abutment position is only reached once and a further position in front of it is reached twice an increase in pressure may be caused. These features may also be used in order to ensure an even more exact setting if the increases in pressure in these cases are at different graduations or steps and especially in the first case where there is a smaller increase in pressure and in the second case where there is a larger increment in pressure. This makes it possible to avoid flutter in the terminal setting.

It is convenient if the first sensor or a further sensor is used to detect a further position which includes the damping stroke of the piston and is outside the possible recoil motion of the piston from the second impact position, and a sensor signal caused on moving past this position may be a necessary condition for an automatic pressure controlling step. This sensor signal preferably also serves to start an automatic control program which is run in an electronic controller in the form of a microprocessor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF WORKING EMBODIMENTS OF THE INVENTION

Figure 1:
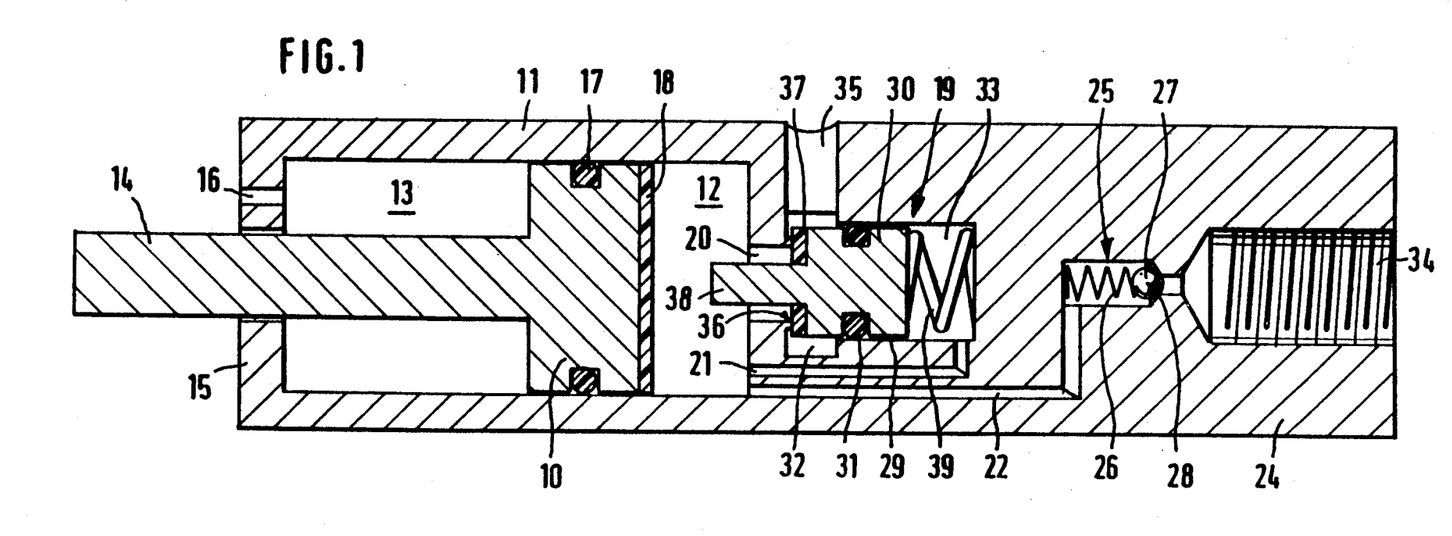
FIG. 1 is a shock absorber in a longitudinal section as a first working example of the invention.

In the case of the working example of the invention shown in FIG. 1, a piston 10 is able to slide within a cylinder 11. The space within the cylinder 11 is divided by the piston 10 into a pressure space 12 and a second pressure or cylinder space 13. A piston rod 14 connected with the piston extends through end wall 15, shown on the left in the figure, of the cylinder 11. The second cylinder space 13 is connected with external pressure via a pressure equalizing duct 16 in the left hand end wall 15 so that it is not possible for gage pressure or vacuum to become established in the pneumatic shock absorber. In the peripheral surface of the piston 10 there is an o-ring 17 acting as a piston ring. Furthermore the end surface, delimiting the pressure space 12, of the piston 10 is provided with a sealing coating 18 through which two ducts 20 and 21 leading to an outlet valve 19 and a duct 22 leading to a check valve 25 are able to be sealed when the piston moves out of its left hand first abutment setting and reaches its right hand abutment position on the inner face of a right hand end wall 24 of the cylinder 11.

The check valve 25 set in the right hand end wall 24 has as its main part a spherical valve member acted upon by a spring 26 and which is held against a valve seat 28. It would obviously be possible to have another conventional type of check valve here.

The check valve 25 is connected by an outwardly extending connection 34 in a manner not indicated with pressure source, preferably via a pressure setting valve or pressure controller for setting the pressure.

The outlet valve 19, also arranged in the right hand end wall 24, has as its main part a valve piston 30 able to be slid in a cylinder-like valve chamber 29. There is an o-ring 31 in the peripheral face of the piston so that the valve chamber 29 is divided up into to separate chamber parts 32 and 33. The first chamber part 32 on the left hand side of the valve piston 30 is on the one hand connected via the duct 20 with the pressure space 12 and on the other hand is connected via an outlet duct 35 with the atmosphere surrounding the cylinder 11. The edge of the port of the duct 20 opening into the first chamber part 32 is in the form of a valve seat 36, the valve piston 30 being provided at the corresponding opposite surface with an annular seal 37. This annular seal 37 may naturally also be so let into the right hand end wall 24 that it fits around the port of the duct 20.

A plunger 38 extends from the left hand side of the valve piston 30 through the duct 20 as far as a point within the pressure space 12 so that the valve piston 30 may be moved against the force of a valve spring 39, arranged in the second chamber part 33, away from the valve seat 36 into the valve chamber 29 and the connection of the pressure space 12 with the outlet duct 35 is opened.

The working example of the invention shown in FIG. 1 serves as a pneumatic shock absorber. Via the connection 34 and the check valve 25 the pressure space 12 is subjected to an adjustable initial pressure, such initial pressure being able to be set via a pressure controller, an adjustable pressure control valve or the like in accordance with the desired damping properties and the impacts which occur and which are to be damped.

In the basic setting the piston 10 is on the left hand end wall 15 so that it is located in its first abutment position in which it is held by the initial pressure in the pressure space 12, which is supplied through the connection 34 via the check valve 25. The valve piston 30 is located in the indicated position in which it is held by the force of the spring 39 and it is also acted upon by the initial pressure in the second chamber part 33, which is supplied via the duct 21. Since the acting surface of the valve piston 30 in the second chamber part 33 is larger than the surface closing the valve seat 36, this initial pressure additionally is responsible for a pressure on the valve piston 30 acting towards the valve seat 36.

If now an impact to be damped is transmitted via the piston rod 14 to the piston 10 the latter will move from the left hand first side abutment position, with a compression and reduction in the air volume. The outlet valve 19 remains closed, since the increasing pressure in the pressure space 12 will also take effect in the second chamber part 33 over a large surface on the valve piston 30.

The pressure in the pressure space 12 will continue to increase until the piston 10 reaches the plunger 38 and via the latter pushes the valve piston 30 into the valve chamber 29. The pressure in the pressure space 12 may now be let off via the duct 20 and outlet duct 35. Since the volume of air present at the beginning of damping is compressed until a point just short of the second abutment position, there may be an almost maximum energy yield with respect to the work performed on the gas. The let off of the air takes place abruptly on opening the valve piston 30, but however it would be possible for it to be checked by a choke.

In the second abutment position the valve piston 30 is forcibly retained in the open setting. The pressure medium now flowing via the opened check valve 25 to occupy the space is however shut off at the port of the duct 22 by the sealing coating 18 so that it is not able to flow out through the outlet duct 35.

In place of the sealing coating 18 the valve piston 30 may be provided with a suitable annular seal, generally the same as the annular seal 37, at the opposite end, such seal shutting off the port of the duct 21 from second chamber part 33 in the moved-in setting of the valve piston 30. In this case the duct 22 from the check valve 25 does not extend to the pressure space 12 but to the second chamber part 33. In the second abutment position this prevents the entry of compressed air into the pressure space 12 owing to the additional annular seal and the shock absorber may be used as a fixed abutment. In this respect it is irrelevant whether the moved-in valve piston 30 shuts off the port of the duct 21 or the port of the duct 22 in a sealing manner. In accordance with the position of these ducts this additional seal has to be placed on the valve piston 30 or on the inner wall surface of the second chamber part 33.

If the retaining force on the piston rod 14 is discontinued the piston 10 is moved by the force of the valve spring 39 via the plunger 38 away from the second abutment position and it is not possible for air to flow via the duct 22 into the pressure space 12 so that the valve piston 30 is kept in its closing position and furthermore the piston 10 is moved back into its first abutment position.

In the case of the shock absorber described with a high speed venting dependent on the stroke of the piston via the outlet valve 19, the energy adaptation is only by way of the initial pressure set in the pressure space 12. If at a certain initial pressure the drive energy of the piston rod 14, that is to say the impact energy to be damped, sinks below the corresponding minimum energy, then it is not possible for the piston 10 to reach the second abutment position, since the compressed air is not able to be discharged. If this eventuality is to be taken into account, the surface of the valve piston 30 adjacent to the pressure space may be divided up into two surface parts which are sealed off from each other and which may be moved towards and away from other in the direction of motion of the valve piston, the outer annular surface being connected via a check valve with the pressure space. If after a rise in pressure there is a decrease again without the valve piston being opened, the maximum pressure peak will be sustained in the outer annular surface owing to the check valve and the compressed air may be let off. The resulting pressure drop in the shock absorber makes it possible for the second abutment position to be reached, there again being a venting action via the plunger 38 in a way dependent on the stroke. Such a design of the valve piston may be produced relatively simple if the described additional function is desired.

Figure 2:
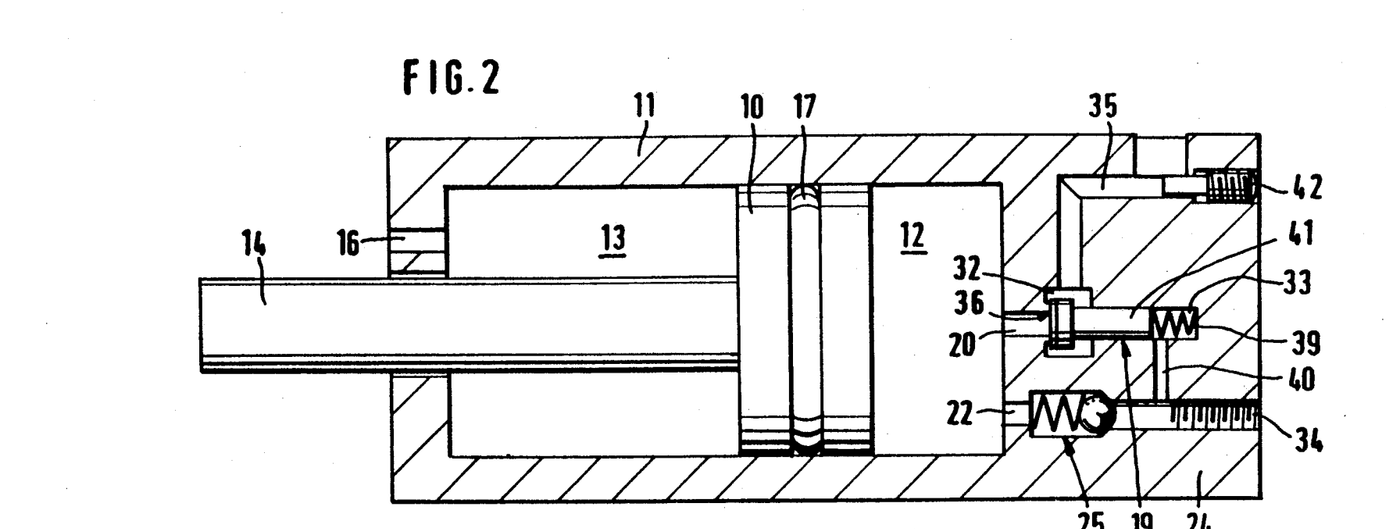
FIG. 2 is a further shock absorber in longitudinal section as a second working example.

The second working example of the invention shown in FIG. 2 is generally similar in structure to the first example to be seen in FIG. 1. Similar or functionally equivalent components are provided with the same references and are not described a second time. Unlike the first example of the invention the second chamber part 33 of the outlet valve 19 is now connected via a duct 40 with the connection 34, that is to say directly with the source of air under pressure and it is no longer connected with the pressure space 12. In the outlet valve 19 the valve piston 30 is has been replaced by a valve piston 41, which does not have any plunger extending into the pressure space 12. The acting face in the second chamber part 33 on the valve piston 41 is now generally equal to that surface of the valve piston on the opposite side, through by which the valve seat 36 is covered. In the outlet duct 35 there is an adjustable choke 42, which may be set for example by turning a set screw to obstruct a rectangular cross section to a greater or lesser extent.

Since the initial pressure acts on the valve piston 41 at first on both sides over equal areas, there is a compensation of pressure so that this valve piston 41 is only acted upon by the force of the valve spring 39 acting towards the valve seat 36. This compensation of the initial pressure thus remains during the damping operation, since in the second chamber part 33 there will still be the initial pressure, while the pressure at the opposite surface will increase owing to the compression stroke of the piston 10. Dependent on the force of the valve spring 39 there will be, as from a certain pressure level, an opening of the outlet valve 19, which may for instance take place very quickly if the valve spring 39 has a low force. During the rest of the compression stroke the compression pressure may be let off via the choke 42 at a more or less high rate so that this choke 42 may be used to affect the damping properties to a substantial degree. If the valve spring 39 is weak the choke 42 will determine the damping effect over nearly the full compression stroke, such damping being therefore very even and continuous.

When the piston 10 reaches the second abutment position, the outlet valve 19 is again closed by the force of the spring 39, since there will be same initial pressure again acting at the two opposite acting end faces of the valve piston 41.

If the retaining force ceases, the piston 10 will be moved back again by the air entering via the check valve 25 into the first abutment position, while the outlet valve 19 remains shut. Release of the compressed air is therefore not likely in either of the two abutment positions.

Figure 3:
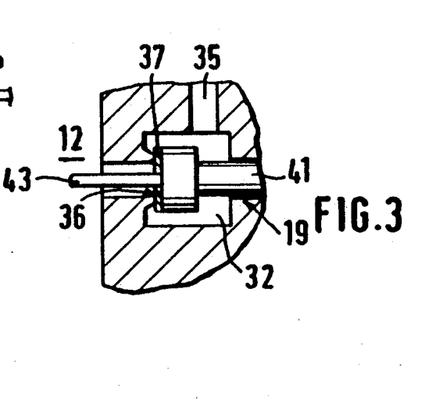
FIG. 3 is part of an alternative design of the damping piston shown in FIG. 2.

FIG. 3 shows a modified form of the working example of the invention shown in FIG. 2 in section. The valve piston 41 is also provided with a plunger 43 extending into the pressure space 12 so that when the second abutment position is reached the outlet valve 19 is forced open by the piston 10, even if the increase in pressure in the pressure space 12 would not be sufficient for this purpose. Such a deign is useful in cases in which the valve spring 39 is powerful and the outlet valve 19 is to be opened at a very later point in time.

Figure 4:
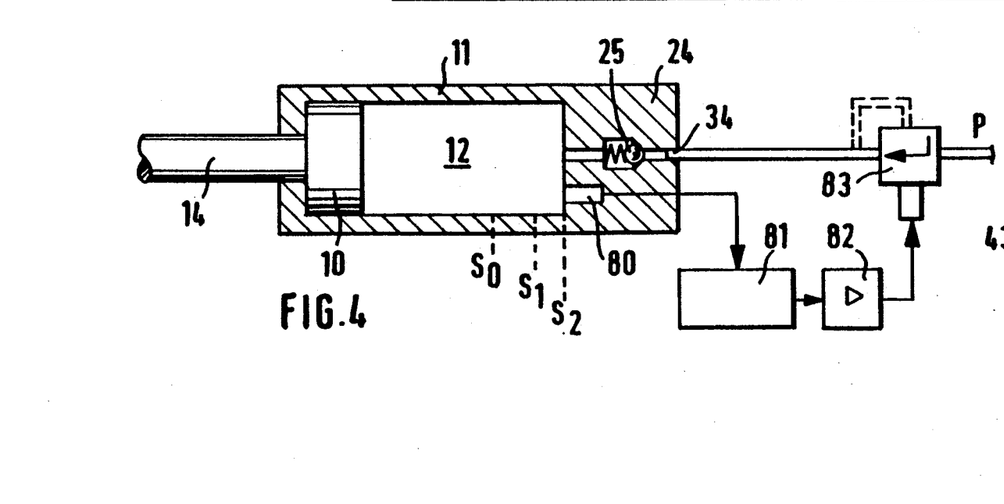
FIG. 4 is a diagrammatic view of a shock absorber in connection with a pressure control circuit for establishing the initial pressure of the shock absorber.

FIG. 4 diagrammatically shows the cylinder 11 in connection with an automatic pressure control circuit. This automatic pressure control circuit may however be used for other pneumatic shock absorbers, in which the pressure space is supplied with initial pressure via a check valve. Any necessary damping properties with outlet ducts responsible therefor may be designed in accordance with another one of the known designs.

In the second abutment position in FIG. 4 the right hand end wall 24 is provided with a sensor 80 for detecting the piston motion, preferably in a contact-free manner, adjacent to the second abutment setting. This sensor may for instance be a capacitive or inductive proximity sensor so that different positions are indicated by different signals thereof. It is obvious that a number of such sensors may be provided for detecting a number of such positions. In this respect the speed of the piston may be additionally detected by processing the rate of sensor signal change.

The signals of the sensor 80 are supplied to an automatic pressure control circuit, which consists of electronic control means 81, preferably in the form of a microcomputer. The output signal of it is amplified in an amplifier 82 and operates a pressure controller 83. This pressure controller 83 is preferably in the form of a pressure controlling valve, more especially in the form of a pressure proportional valve. A source P of pressure is connected via the pressure controller 83 to the connection 34.

The automatic pressure controlling circuit may be used to produce an optimum setting of the initial pressure in the pressure space 12, there being an automatic adaptation to any change in the impact load of the device to be damped. This in principle is brought about by assuming that there is an optimum damping state when owing to a shock to be damped the piston reaches the second abutment position quickly but gently and without recoil. If it recoils then the initial pressure is too low and will have to be increased. If however it reaches the abutment position too slowly or does not reach it at all, the initial pressure will have been too high and will be in need of reduction.

The automatic pressure control circuit may for instance be in the form of a compact unit arranged on the shock absorber and will only need a supply of electrical power and a compressed air connection.

Figure 5:
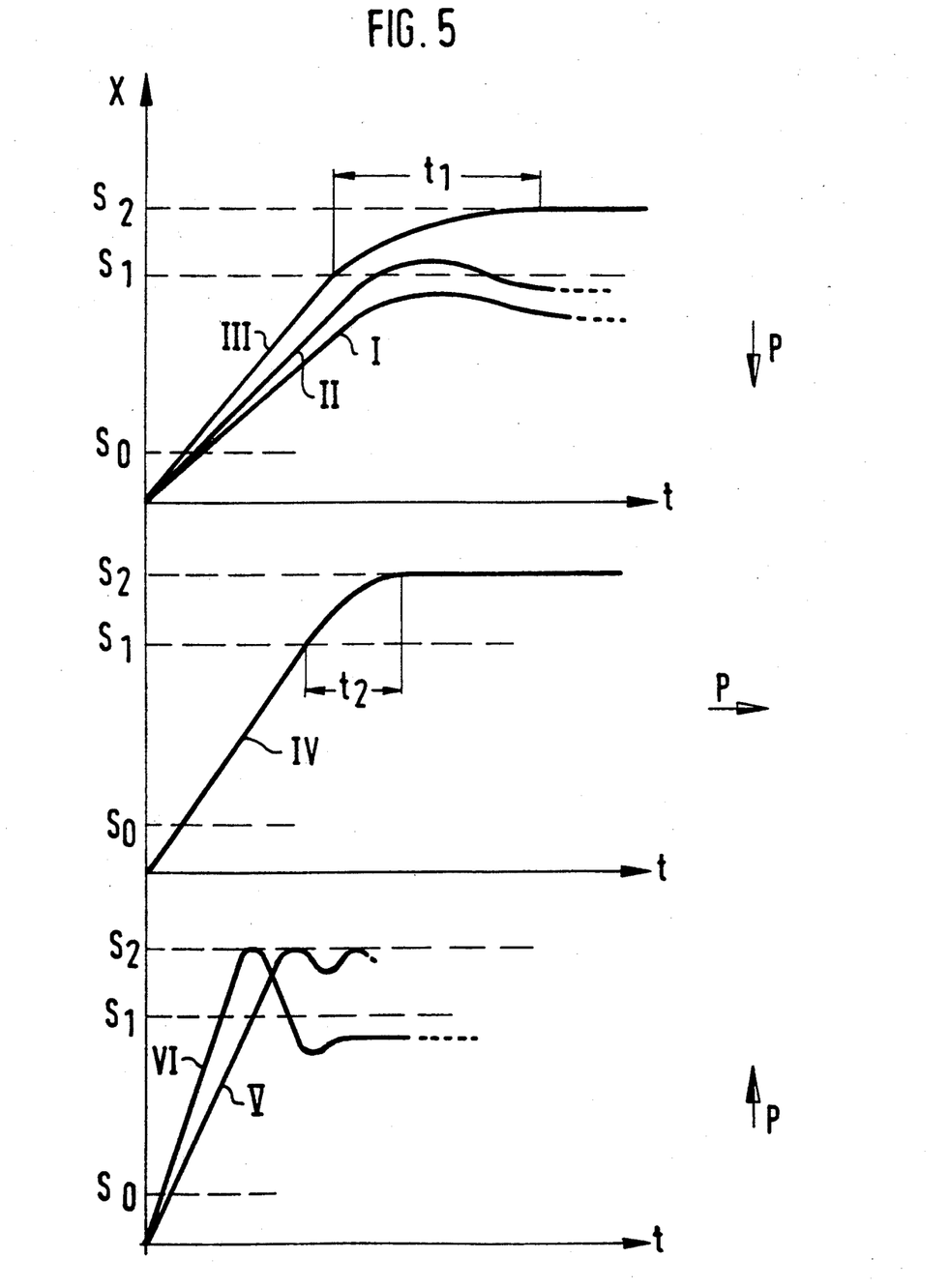
FIG. 5 shows typical characteristic curves as functions of piston motion at different initial pressures.

With pressure control in fine stages the cases I-IV represented in FIG. 5 of different strokes of the piston 10 are to be distinguished. For this purpose the positions S0, S1 and S2 adjacent to the second abutment position are detected by the sensor 80 or additionally by a further sensor. The position S0 is so far from this abutment position that recoil of the piston past this position is not to be expected so that a sensor signal S0 with the same designation may be used as the criterion for the piston motion and is used for activating the automatic pressure control circuit or is used to start the program of the microprocessor in the controller 81. The position S1 is near the abutment position S2 and if there is piston recoil from the abutment position it may be exceeded on one or more times.

The curve I indicates the case of an initial pressure which is far in excess of the right value, that is to say only a signal S0 and neither a signal S1 or a signal S2 is produced. The vastly excessive initial pressure will have to be greatly decreased.

The curve II shows the case in which after the production of a signal S0 the position S1 is passed over one or more times but the abutment position S2 is not reached. The initial pressure is still on the high side and will have to be lowered.

The curve III shows the case in which all positions are reached, that is to say in which the piston gently comes into the second abutment position without recoil. However the time t1 between the positions S1 and S2 is very long, that is to say the speed is very low. Since this time t1 is longer than the maximum permissible time $T_{max}$, the initial pressure is still slightly on the high side and will have to be lowered by a small amount.

The curve IV indicates the ideal stroke of the piston 10, that is to say a respective signal S0, S1 and S2 is produced—as in the case of curve III—but the time T2 elapsing between the positions S1 and S2 is under a maximum allowable time $T_{max}$ and is greater than a minimum necessary time $T_{min}$. The initial pressure will not have to be changed.

The curve V shows the case of an insufficient initial pressure, that is to say a respective signal S0 and S1 is produced, but more than one signal S2 is produced because the piston recoils back from the second abutment position owing to an excessive impingement speed one or more times. The initial pressure will have to be increased.

Lastly the curve VI shows the case of an initial pressure which is much too low, that is to say the piston is driven at such a high speed into the second abutment position that the recoil motion goes past the position S1, and one of signal's S0 and signal's S2 are produced but more than one signal S1 is produced.

Figure 6:
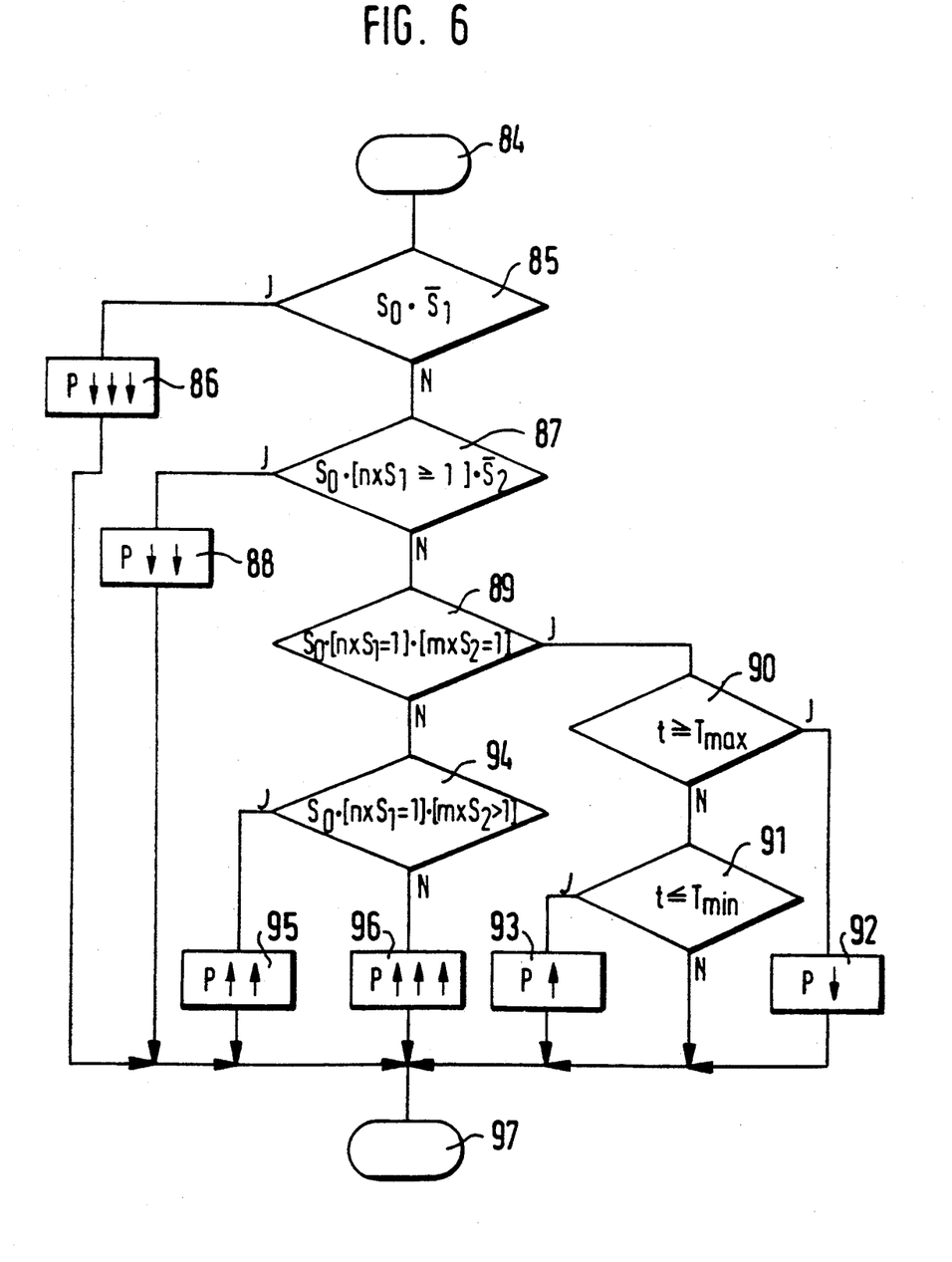
FIG. 6 is a flow chart in order to explain the manner of operation of the automatic pressure control circuit.

FIG. 6 shows a flow chart for explaining the manner of operation of the automatic pressure control circuit or the electronic controller 81. In this respect the points between signals indicate connections between these signals, while a transverse line over a signal has a negating meaning, that is to say this signal is undesired.

After the start of the program at 84, which is caused for instance by a signal S0 or by switching on the electrical power supply, a checking step 85 is firstly performed to see if the conditions of curve I are complied with, that is to say whether after a signal S0 there is no signal S1 within an adjustable time. If this is the case then in a pressure reducing step 86 the initial pressure is considerably decreased using the pressure controller 83, something that may only take place during the next following damping operation.

If this condition is not complied with, then a checking step 87 is performed to see whether the conditions of curve II are complied with, that is to say whether a signal S0, at least one signal S1 but no signal S2 is produced. If this is the case, then the initial pressure 88 is decreased but not to the same extent as in the step 86.

If however this condition is not complied with, the checking operation 89 is performed to see if the conditions of the curves III and IV are complied with. If these conditions are complied with, the checking steps 90 and 91 are performed to check if the time t is longer than or equal to the maximum permissible time $T_{max}$ or is shorter than or equal to the minimum time $T_{min}$. In the former case the pressure reducing operation 92 is performed to slightly decrease the initial pressure and in the second case the initial pressure is slightly raised. If neither of the two conditions is fulfilled, the conditions are ideal and the actual initial pressure setting is adhered to.

However if the condition in the checking step 89 is not fulfilled, the checking step 94 is performed to see if the conditions of curve V are complied with, that is to say whether the signals S0 and S1 each occur once over while on the other hand the signal S2 occurs at least twice. In this case the pressure increasing operation 95 is performed to produce a marked increase in the initial pressure. If on the other hand the condition of the checking step 94 are not complied with, it is only possible for the conditions of curve VI to be complied with and initial pressure is increased by a greater amount in the pressure increasing step.

After the respective operations for increasing the pressure or for decreasing same, the program ends at 97. If the program was started at 84 by switching on the electrical power, the entire program sequence may be performed cyclically.

It is naturally possible for the operations of changing the initial pressure to be simpler or with a greater degree of subdivision by making less or more investigations of cases than is the case with FIG. 5. This may take place by monitoring a larger or smaller number of positions in the range at the second abutment position. In the simplest case, it is for example possible only to monitor the reaching of the second abutment position, failure to reach it leading to a decrease in the pressure, and reaching it leading to an increase in pressure. In this case there is then a subsequent resetting of the initial pressure which takes place after several cycles.

The pneumatic shock absorbers may as a matter of principle also act with a damping effect in the opposite direction, that is to say not only when the piston is pushed in but also when it is pulled out. In the latter case it is naturally necessary for the two cylinder spaces 13 and 12 and the means arranged therein to be changed over.

While specific embodiments of the invention have been shown and described in detail to illustrate the application of the principles of the invention, it will be understood that the invention may be embodied otherwise without departing from such principles.

We claim:

1. A pneumatic shock absorber comprising a piston, a cylinder in which said piston is able to slide, a piston rod attached to said piston and extending out of said cylinder, a check valve forming an inlet to said cylinder via which a pressure space, delimited by said piston in said cylinder, is connected with an external source of pressure fluid, an outlet valve for the discharge of compressed air during a damping motion of the piston, a valve piston comprised in said outlet valve and arranged to run in a valve chamber of said valve in a sealing manner so as to divide said chamber into first and second chamber parts, said first chamber part connecting a duct, which leads to the pressure space, with an outlet duct, and the connection is able to be interrupted by a valve seat arranged to be shut off at least in part by the end face of the valve piston acted upon by the pressure of the pressure space and the second chamber part is connected with the pressure space or with the pressure source and a spring for urging the valve piston against the valve seat.

2. The shock absorber as claimed in claim 1 wherein the spring is in the form of a compression spring and is arranged in the second chamber part.

3. A shock absorber in accordance with claim 1, wherein:
said outlet duct has a cross-section that is changeable in size.

4. The shock absorber as claimed in claim 1 wherein the valve piston has a plunger extending into the pressure space when the valve seat is shut off and the active pressure surface of the valve piston in the second chamber part is at least equal to the surface shutting off the valve seat.

5. The shock absorber as claimed in claim 1 wherein at least the duct leading to the check valve extends from the end face, delimiting the pressure space, of the cylinder and this face or the piston face adjacent to it is provided with a seal shutting off at least one duct in the abutment positions.

6. The shock absorber as claimed in claim 5 wherein the seal is in the form of a sheet-like coating.

7. The shock absorber as claimed in claim 4 wherein a duct extends between the second chamber part and the end face of the pressure space at which the plunger is arranged.

8. The shock absorber as claimed in claim 1 wherein the said check valve is connected via the second chamber part with the pressure space and wherein a seal on said valve piston or the inner wall surface of the second chamber part is arranged to shut off at least one of the duct ports in the second chamber part when the valve piston is in an inserted position thereof.

9. The shock absorber as claimed in claim 1 wherein said valve piston is provided with a pressure acting surface in the second chamber part which is larger than a surface closing the valve seat.

10. The shock absorber as claimed in claim 1 wherein the second chamber part is connected with the said pressure source and the valve piston has a pressure acting surface in the second chamber part which is substantially equal in size to the surface closing the valve seat.

11. The shock absorber as claimed in claim 10 wherein the second chamber part is connected with a connecting duct extending from a pressure connection, placed on an outer face of the cylinder, to the check valve.

12. The shock absorber as claimed in claim 1 wherein an end face of the valve piston turned towards the valve seat is provided with a seal.

13. The shock absorber as claimed in claim 1 wherein said external pressure source has an adjusting means for the pressure thereof.

14. A pneumatic shock absorber comprising a cylinder, a piston adapted to slide in said cylinder, a piston rod on said piston extending out of said cylinder, a check valve for connecting a pressure space delimited by said piston with an external pressure source said external pressure source being connected via a pressure controller with the pressure space, said shock absorber further comprising a sensor adapted to detect motion and/or position of the piston at least in the minimum pressure volume state and an automatic pressure control circuit adapted to act on the pressure controller in response to a signal from said sensor.

15. The shock absorber as claimed in claim 14 wherein said automatic pressure control circuit comprises an electronic controller adapted to increase the pressure set by the pressure controller on impact of the piston short of the second abutment setting occurring at minimum pressure space volume and to decrease said pressure when same is not reached.

16. The shock absorber as claimed in claim 15 wherein said sensor connected with the controller is adapted to detect when said second abutment position is reached and when at least one further position short of such position is reached, and in the event of neither position being reached of causing a major pressure reduction and of causing a minor pressure reduction in the event of only the second abutment position not being reached.

17. The shock absorber as claimed in claim 15 wherein said pressure controller is adapted in the event of there being a speed of approach towards the second abutment position under a given speed limit said to reduce the pressure and/or in the case of a speed of approach which is greater than a second preset limit towards the second abutment position to increase the pressure.

18. The shock absorber as claimed in claim 17 wherein in the event of the two said positions being reached once respectively and in the event of the first preset limit being gone below or of the second preset limit being exceeded said pressure controller is adapted to cause a very small pressure change.

19. The shock absorber as claimed in claim 17 comprising means to detect the time of motion between the two said positions in order to ascertain the speed of approach.

20. The shock absorber as claimed in claim 13 wherein in the event of a preset number of sensor signals indicating the second abutment position having been reached an increment in pressure is caused.

21. The shock absorber as claimed in claim 15 wherein on the second abutment position being reached once and on a further position short of such second position being reached at least twice an increment in pressure is effected.

22. The shock absorber as claimed in claim 13 wherein in the event of a preset number of sensor signals indicating the second abutment position having been reached an increment in pressure is caused and on the second abutment position being reached once and on a further position short of such second position being reached at least twice, an increment in pressure is effected, said pressure increments being different in amount.

23. The shock absorber as claimed in claim 15 wherein said sensor or a further sensor is adapted to detect a position relating to the damping motion of the piston and outside the range of possible recoil of the piston from the second abutment position.

24. The shock absorber as claimed in claim 23 wherein the single generation of a sensor signal indicating a position comprising the damping stroke is provided as a necessary condition for a pressure setting operation.

* * * * *